United States Patent [19]
Jabbarnezhad

[11] Patent Number: 5,734,697
[45] Date of Patent: Mar. 31, 1998

[54] METHOD AND APPARATUS FOR IMPROVING TELECOMMUNICATIONS SYSTEM PERFORMANCE

[75] Inventor: Javid Jabbarnezhad, Parker, Tex.

[73] Assignee: MCI Corporation, Washington, D.C.

[21] Appl. No.: 431,299

[22] Filed: Apr. 28, 1995

[51] Int. Cl.$^6$ .................. H04M 1/24; H04M 3/08; H04M 3/22

[52] U.S. Cl. .................. 379/32; 379/9; 379/14; 379/242; 370/241; 370/250

[58] Field of Search .................. 379/9, 10, 13–15, 379/22, 32, 34, 221, 188–189, 191, 201, 207, 219, 224, 242, 244, 268–269; 340/825.16, 825.26, 825.49; 370/13, 241–242, 244–245, 250, 252; 395/183.01, 183.02, 183.04, 183.06, 183.09

[56] References Cited

U.S. PATENT DOCUMENTS

| | | | |
|---|---|---|---|
| 4,744,026 | 5/1988 | Vanderbei | 379/221 |
| 4,885,686 | 12/1989 | Vanderbei | 364/402 |
| 4,924,386 | 5/1990 | Freedman et al. | 379/221 |
| 4,977,390 | 12/1990 | Saylor et al. | 340/521 |
| 5,008,827 | 4/1991 | Sansone et al. | 364/464.02 |
| 5,136,538 | 8/1992 | Karmarkar et al. | 364/754 |
| 5,459,777 | 10/1995 | Bassa et al. | 379/10 |
| 5,463,686 | 10/1995 | Lebourges | 379/221 |
| 5,473,596 | 12/1995 | Garafola et al. | 370/241 |
| 5,485,590 | 1/1996 | Chiu et al. | 379/269 |
| 5,513,343 | 4/1996 | Sakano et al. | 395/183.02 |
| 5,572,189 | 11/1996 | Yamamoto et al. | 379/244 |
| 5,579,384 | 11/1996 | Seymour | 379/244 |
| 5,594,861 | 1/1997 | Jonsson et al. | 379/242 |

*Primary Examiner*—Curtis Kuntz
*Assistant Examiner*—Binh K. Tieu

[57] ABSTRACT

A method and apparatus are described which automatically allocate available physical resources of a telecommunications network to efficiently resolve network problems and improve the serviceability, availability and reliability of such networks. Large volumes of sensor data representing faults in the operational condition of elements of the telecommunications network are collected in a buffer. A network performance index is calculated for the entire network or for any portion of the network, thereby assembling the data into easily understood, accurate measurement of transmission performance. The network performance index is then compared with predetermined target values to determine what resources to allocate.

12 Claims, 18 Drawing Sheets

Flow Diagram of Collection Routine

NACS Signal Format

Fig. 7c

Table of Selected Alarms and their Performance Values
(Alarm Table) 750

| Alarm No. | Alarm Type | REGIONS | Performance Values | | |
|---|---|---|---|---|---|
| | | | M | N | O |
| 153 | Traffic on Spare | 1,4 | 0.5 | 0.2 | 0 |
| 161 | Switch Failed to Complete | 4 | 0 | 0 | 1 |
| 182 | Path Switch Disabled | 7 | 0 | 0 | 1 |
| 636 | Optical RX Loss of Signal | 2 | 0 | 0 | 1 |
| 1017 | Bit Error Rate (>10e??) | 5,6 | 0.5 | 0 | 0 |
| 1179 | DS3, 1-18 Disabled from going to spare | 7 | 0 | 0 | 1 |
| 1083 | Fiber Optic Receive Fail S.A. | 9 | 0 | 0 | 1 |
| 1084 | Fiber Optic Signal Failure | 9 | 0 | 0 | 1 |
| 1085 | Fiber Optic Receive Failure | 9 | 0 | 0 | 1 |
| 1181 | DS3 1-18 RX on SP Status | 1,4 | 0.5 | 0.2 | 0 |
| 1182 | DS3 1-18 RX Switch Alarm | 4 | 0 | 0 | 1 |
| 1189 | DS3 1-18 Unprotected | 1 | 0 | 0 | 1 |
| 1193 | DS3, 9-36 Disabled from going to spare | 7 | 0 | 0 | 1 |
| 1195 | DS3 9-36 RX on SP Status | 1,4 | 0.5 | 0.2 | 0 |
| 1196 | DS3 9-36 RX Switch Alarm | 4 | 0 | 0 | 1 |
| 1203 | DS3 9-36 Unprotected | 1 | 0 | 0 | 1 |
| 1324 | High Speed Protection Path Failed | 7 | 0 | 0 | 1 |
| 1503 | High Speed Equipment Failed (Working) | 8,3 | 0 | 0 | 1 |
| 1504 | High Speed Equipment Failed (Protect) | 8,3 | 0 | 0 | 1 |
| 1505 | High Speed Switch Failed (Working) | 4 | 0 | 0 | 1 |
| 1506 | High Speed Switch Failed (Protect) | 4 | 0 | 0 | 1 |
| 1507 | Fiber Optic RX Failed (Working) | 9 | 0 | 0 | 1 |
| 1508 | Fiber Optic RX Failed (Protect) | 9 | 0 | 0 | 1 |
| 1509 | High Speed Signal DEG (Working) | 5,6 | 0.5 | 0 | 0 |
| 1510 | High Speed Signal DEG (Protect) | 7 | 0 | 0 | 1 |
| 1515 | High Speed Lock Out (Working) | 7 | 0 | 0 | 1 |
| 1516 | High Speed Lock Out (Protect) | 5,6 | 0 | 0 | 1 |
| 1521 | High Speed Switch Complete | 1,4 | 0.5 | 0.2 | 0 |
| 1522 | High Speed Switch Complete | 1,4 | 0.5 | 0.2 | 0 |

Fig. 11

| Target Value | Resource Allocation Command |
|---|---|
| 70% | Schedule Routine Maintenance |
| 60% | Schedule Expedited Maintenance |
| 50% | Temporary Reroute |
| 40% | Indefinite Reroute<br>Schedule Immediate Maintenance |
| 20% | Take Network Portion Offline<br>Schedule Emergency Maintenance |

Fig. 13

Cause and Effect Matrix 1300

| Cause & Effect | AC = Transmission Switching Activity | BC = Transmission Signal Degradation | CC = Transmission Failure |
|---|---|---|---|
| AE = Network Increase in Network Susceptibility | Region - 1<br>153, 1181, 1195, 1521, 1522 | Region - 2<br>636 | Region - 3<br>1503, 1504 |
| BE = Network Performance Degradation | Region - 4<br>161, 1182, 1196, 1505, 1506, 153, 1181, 1195, 1521, 1522 | Region - 5<br>1017, 1509, 1510, 1203, 1189 | Region - 6<br>1017, 1509, 1510 |
| CE = Outages | Region - 7<br>182, 1179, 1193, 1515, 1324, 1516 | Region - 8<br>1503, 1504 | Region - 9<br>1085, 1083, 1507, 1508 |

5,734,697

METHOD AND APPARATUS FOR IMPROVING TELECOMMUNICATIONS SYSTEM PERFORMANCE

BACKGROUND OF THE INVENTION

1. Field of the Invention

The invention relates generally to telecommunications networks, and more particularly to a method and apparatus for improving the serviceability, availability and reliability of such networks.

2. Background Information

The efficient operation of a large telecommunications network is a large and involved undertaking. Such a network may comprise hundreds, or perhaps thousands of physical elements. Each such element may, in turn, be made up of a large number of electronic and mechanical components. Although the elements are designed to maximize reliability, no element is perfectly reliable. Even the most reliable of system elements occasionally suffers a partial or complete degradation of performance.

There are many factors which can affect the performance of a telecommunications network element. There are many different types of network elements. There are repeaters which amplify the analog signal being transmitted. There are regenerators which clean up and repeat digital signals. There are multiplexers which combine several signals into one. There are transmission lines, both electrical and optical, which carry signals great distances. There are switches which select paths or circuits for signals. Each of these elements may break down and degrade network performance.

Network elements are often installed outdoors where the weather can affect them. Heat and cold can affect the functioning of electronic components. Humidity and wetness can corrode electrical connections and mechanical couplings. Wind can cause physical damage to the equipment and lightning can cause electrical damage. Fluctuations in the voltage of the electrical power supplying the element can cause damage or degrade performance. The performance of many electrical and mechanical systems degrades over time simply due to use. Finally, degradation of one network element may degrade the performance of other elements by placing increased stress on the other elements.

Sensors are placed on network elements which detect and report the occurrence of a variety of abnormal conditions. Some sensors directly detect degradation of performance of a network element, while others detect conditions which are likely to cause degradation of performance. The information gathered by the sensors is communicated to a central location. In a large network, the volume of sensor information may be very large. Further, many of the conditions reported from the sensors are transitory or change quickly and often. In the current art, this information is simply displayed to human operators.

The human operators are responsible for allocating and mobilizing the physical resources of the network. This may involve anything from re-routing network traffic to ordering repair crews to particular locations. The various resources mobilized must work in harmony with each other in order to maximize efficiency. The only way the physical resources can be properly managed is if the human operators have complete and accurate information about network conditions. However, the volume of information reported from the sensors is such that it is impossible for human operators to comprehend this large volume of quickly changing information. It is very difficult for the human operators to manage the network resources in real-time at peak efficiency. It is also very difficult to track system and component performance over time, so as to identify ongoing problems or those components or persons accountable for those problems.

A method and apparatus for automatically monitoring and adapting a network to overcome the above described problems would improve the serviceability, availability and reliability of telecommunications networks.

SUMMARY OF THE INVENTION

An object of the invention is to automatically mobilize and harmonize available physical resources of a telecommunications network to efficiently resolve network problems and improve the serviceability, availability and reliability of such networks.

Another object is to collect and assemble large volumes of sensor data from a telecommunications network into easily understood, accurate measurement of transmission performance of the entire network or any portion of the network, thereby permitting real-time management of network resources for improved serviceability, availability and reliability, i.e., performance, of the network.

Another object is to accurately predict from sensor data, the transmission performance of the entire network or any portion of the network, to permit efficient management of the network resources.

Still another object is to accurately track the network transmission performance for identification and correction by service personnel of transmission problems.

These and other objects of the invention are accomplished by a system and method for automatically tracking network performance to identify network and resource problems for correction by service personnel. Incoming Network Alarm Contact System (NACS) signals from the telecommunications network are received, parsed and collected. The signals are then sorted and categorized into a 3×3 Cause and Effect matrix. The Control Table is then populated by assigning the Performance Values obtained from the Alarm Table to each area of the Control Table. This creates a Control Table of the transmission alarm system. All computed Performance Value totals of the alarm signals are then linearly added. The derived totals of the error performance from the Control Table are then inserted into their respective formulas and the results calculated. These results are combined to derive the Network Performance Index (NPI).

The NPI can be determined for the entire telecommunications network or for any portion of it. Once the NPI is determined for a portion of the network, the proper amount and type of physical resources which must be allocated to that portion of the network are determined. In addition, the NPI is determined repeatedly over periodic time intervals, known as the reporting period. In this way, a record of the NPI is created over time. This allows physical resources to be allocated in response to medium and long term trends in network performance, in addition to short term occurrences.

BRIEF DESCRIPTION OF THE DRAWINGS

FIG. 7c is a Table of Selected Alarms and their Performance Values. This table shows the NACS alarm types which have been selected for the NPI and their Control Matrix population Performance Values.

FIG. 11 is a chart of typical target values and corresponding resource allocation commands.

FIG. 13 is a Cause and Effect Table. This table shows the categorization of alarm signals into different regions of the table based on the cause and effect of each alarm.

DESCRIPTION OF THE PREFERRED EMBODIMENT

Figure 1:
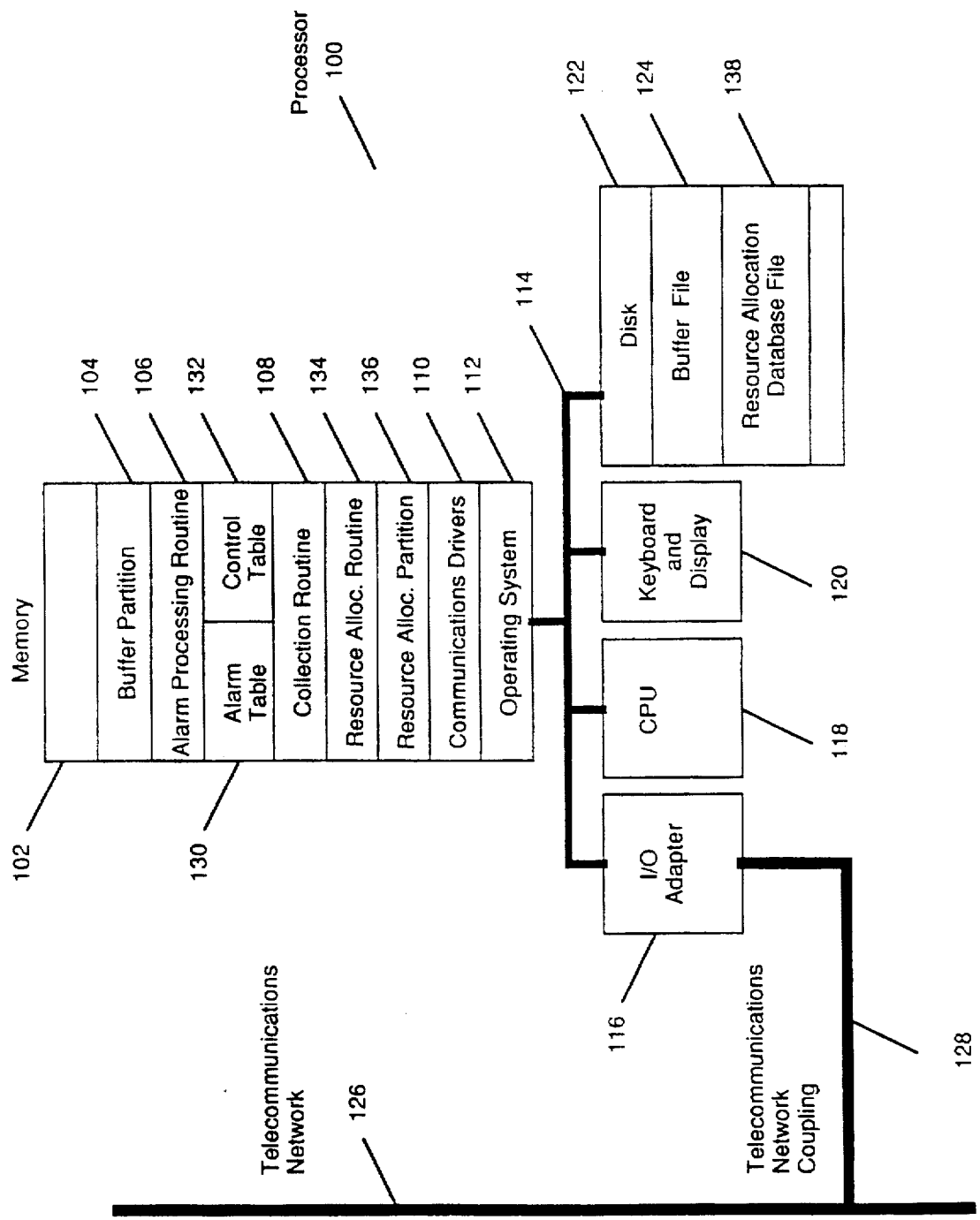
FIG. 1 is a system block diagram of one embodiment of the invention.

FIG. 1 shows a system block diagram of the invention. Shown is the telecommunications network 126 which, while not part of the invention, is coupled to the I/O adapter 116 by means of telecommunications network coupling 128. The I/O adapter 116 is part of the processor 100. Also part of the processor 100 are the CPU 118, the memory 102, the keyboard and display 120, the disk 122 and the bus 114. The bus 114 couples together the I/O adapter 116, the CPU 118, the memory 102, the keyboard and display 120, and the disk 122. The memory 102 contains a buffer partition 104, the alarm processing routine 106, the collection routine 108, the resource allocation routine 134, the communications drivers 110 and the operating system 112. The memory also contains the alarm table 130, control table 132, and the resource allocation database partition 136. The disk 122 contains the buffer file 124 and the resource allocation database file 138.

Figure 12:
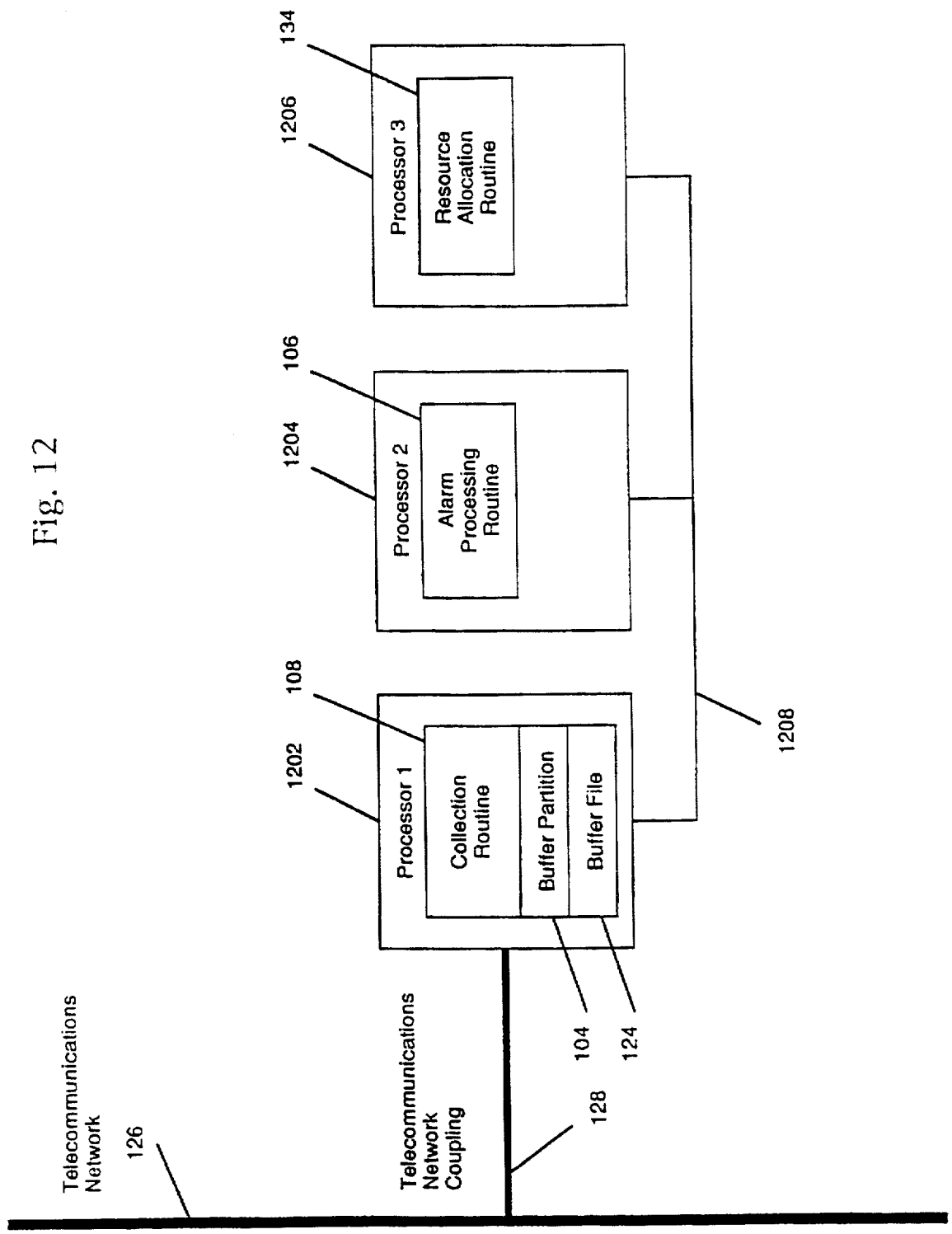
FIG. 12 is a block diagram of another embodiment of the invention.

Briefly turn to FIG. 12. In this embodiment the functions which were performed by one processor 100 in FIG. 1 are performed by three processors 1202, 1204 and 1206. Each processor 1202, 1204 and 1206 is similar to processor 100 in that they contain memory 102, bus 114, CPU 118, keyboard and display 120, and disk 122. Each processor 1202, 1204 and 1206 is attached to a local area network 1208 by which they can communicate with each other. The telecommunications network 126 is coupled by means of the telecommunications network coupling 128 to the I/O adapter 116 of processor 1 1202. Processor 1 1202 contains the collection routine 108 in its memory. Processor 1 1202 also contains the buffer partition 104 in its memory 102 and the buffer file 124 in its disk 122. Processor 2 1204 contains the alarm processing routine 106, the alarm table 120 and the control table 132 in its memory 102. Processor 3 1206 contains the resource allocation routine 134 and the resource allocation partition 136 in its memory 102 and the resource allocation database file 138 in its disk. It will be understood by those skilled in the art that it is known to distribute the above described routines, partitions and files among processors in other arrangements than those described above.

Figure 2:
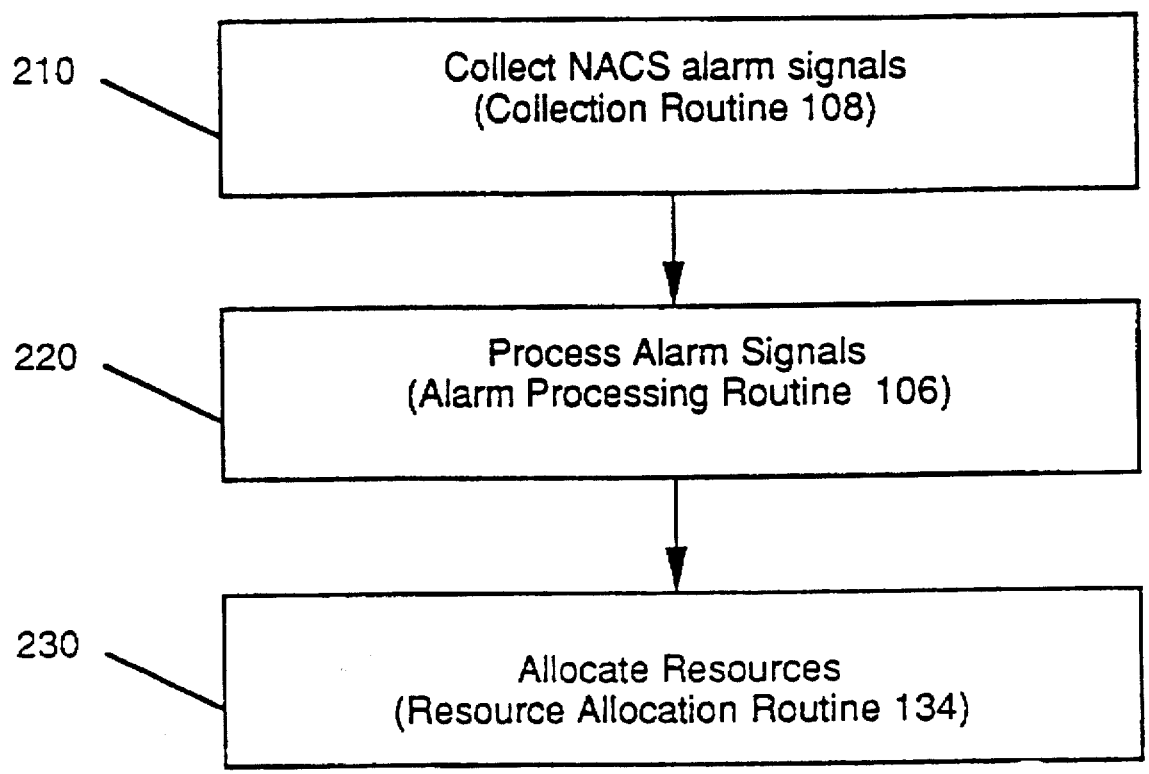
FIG. 2 is a flow diagram of the overall operation of the invention shown in FIG. 1.
Figure 3:
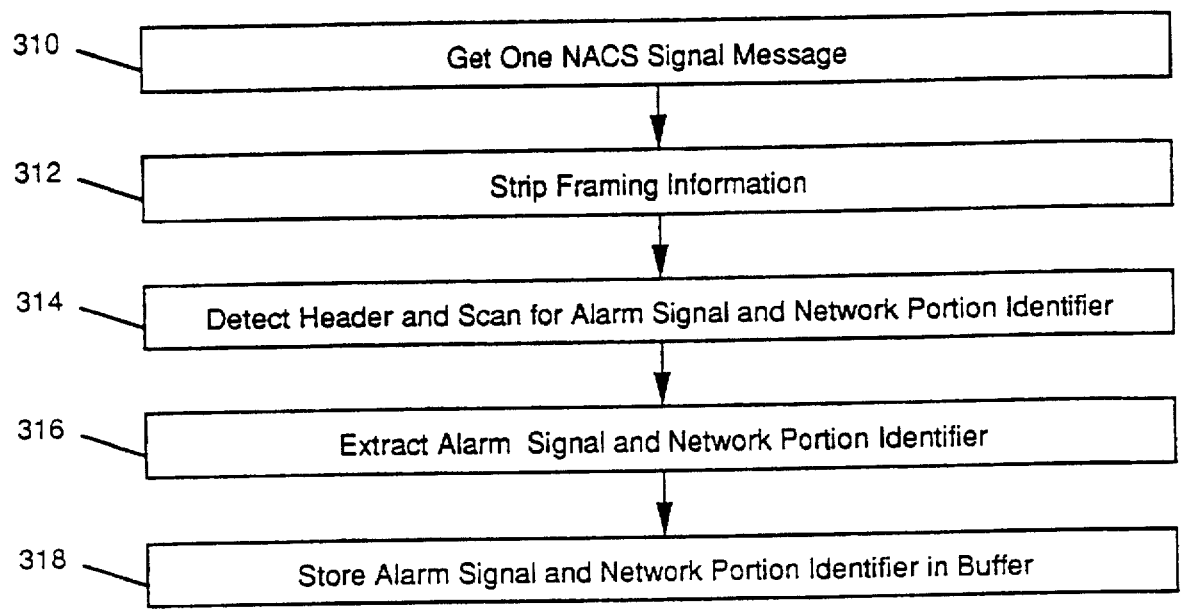
FIG. 3 is a flow diagram of a collection routine 108 included in FIGS. 1 and 2.

Now turning to FIG. 2, in step 210, NACS alarm signals are collected by the collection routine 108, which is shown in more detail in FIG. 3. In step 220, the collected alarm signals are processed by the alarm processing routine 106, which is shown in more detail in FIG. 8. In step 230, the resource allocation routine 134 utilizes the output of the alarm processing routine 106 to determine the appropriate resources to allocate, as is shown in more detail in FIG. 9.

Figure 4:
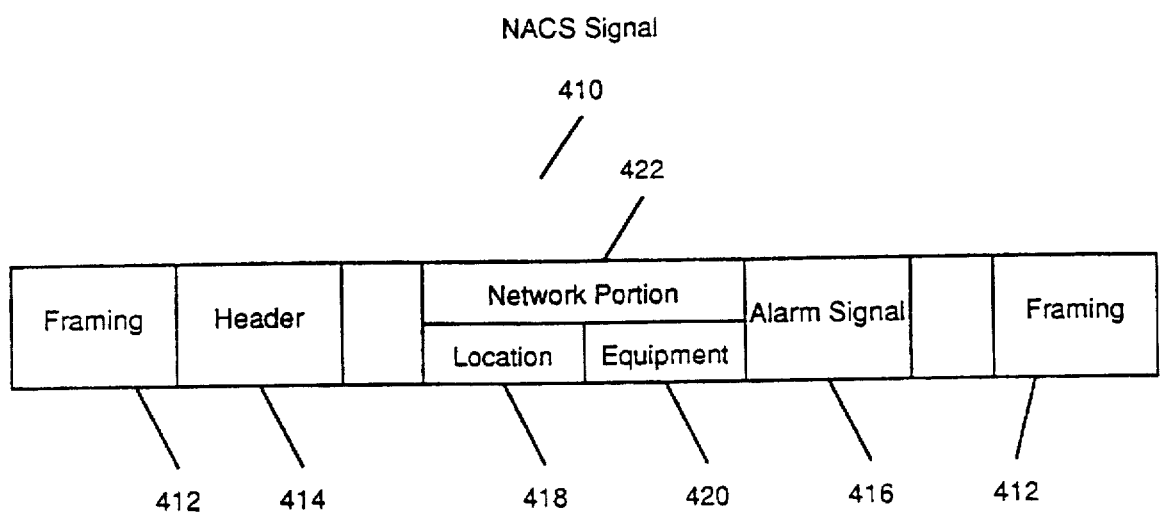
FIG. 4 is a NACS alarm signal format.

FIG. 3 shows a flow diagram of the collection routine 108. FIG. 4 shows the format of a NACS signal 410. FIG. 3, the collection routine 108, can be understood with reference to FIG. 4, the NACS signal format 410. The collection routine 108 includes step 310 where it gets one NACS signal 410. In step 312, the NACS signal framing information 412 is stripped. In step 314, the NACS signal header 414 is detected and used as the starting point to scan for the network portion identifier 422 and the alarm signal 416. The network portion identifier comprises a site identifier 418, which identifies the site where the equipment generating the alarm signal is located, and an equipment identifier 420, which identifies a particular piece of equipment at the site which generated the alarm signal. In step 316, the alarm signal 416 and associated network portion indicator 422 are extracted. In step 318, the alarm signal 416 and its associated network portion indicator 422 are stored in the buffer 500. The collection routine 108 is executed for each alarm signal that is received from the telecommunications network 126.

Figure 5:
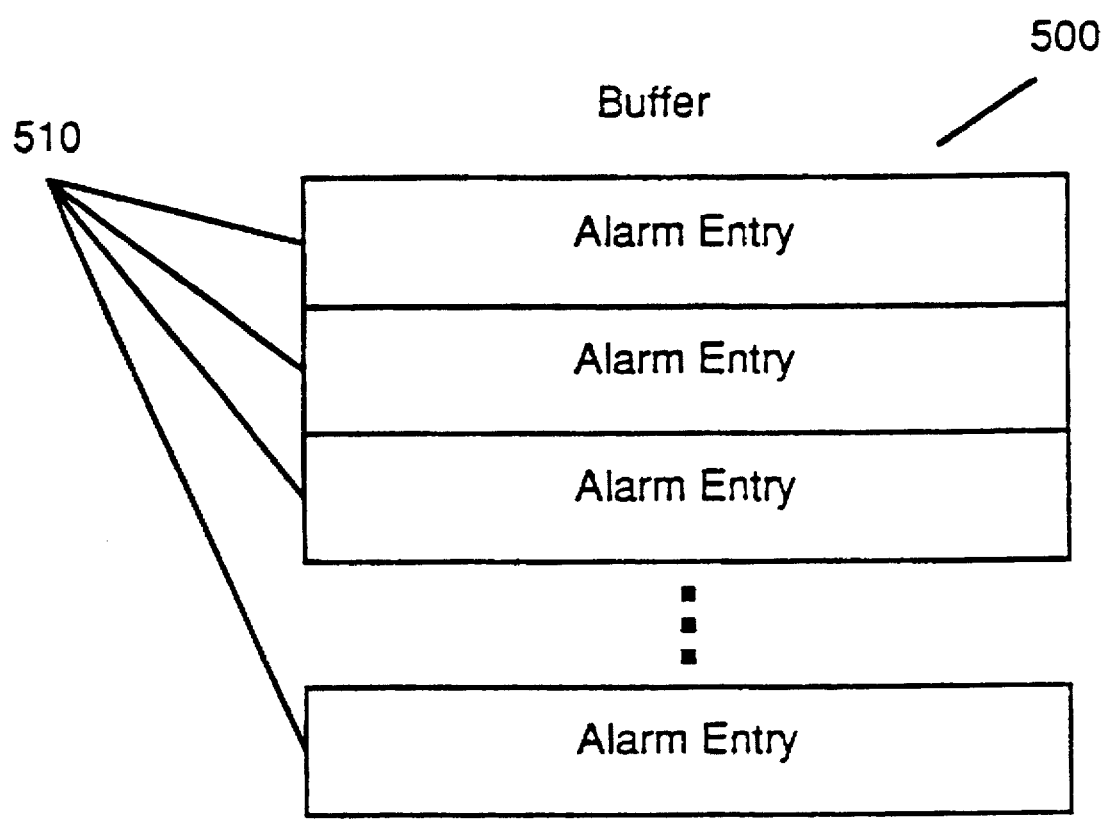
FIG. 5 is an internal structure of a buffer in FIG. 1 for collecting incoming data.

FIG. 5 shows the internal structure of the buffer 500. A plurality of alarm entries 510 are sequentially stored. Each alarm entry comprises a stored alarm signal 416 and its associated network portion identifier 422. The alarm entries 510 may be sequentially or randomly accessed. The buffer 500 is located in the buffer partition 104 in memory 102. In an equivalent embodiment, the buffer is located in the buffer file 124 in the disk 122. In another equivalent embodiment, the part of the buffer is located in the buffer partition 104 in memory 102 and part of the buffer 500 is located in the buffer file 124 in the disk 122. In still other equivalent embodiments, the buffer is located in other storage devices such as tape drives, write-once, read-multiple disks and others.

Figure 6:
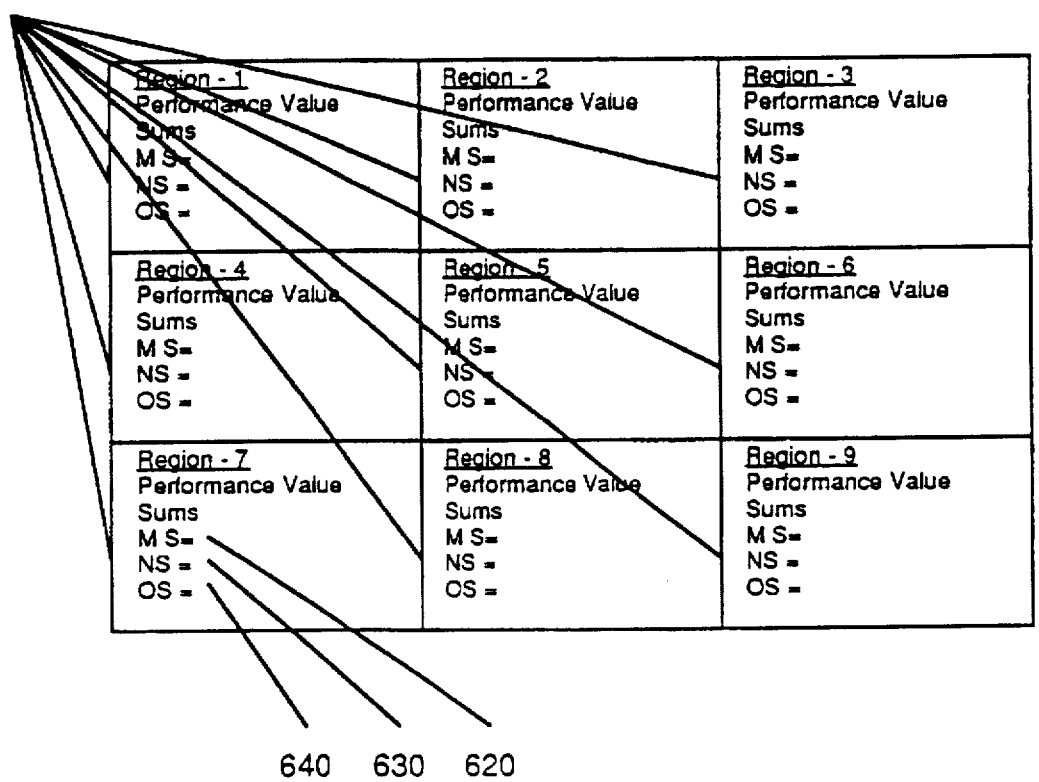
FIG. 6 is a Control Table 132 stored in a memory in FIG. 1 for categorizing incoming data signals as to their cause and effect.
Figure 6A:
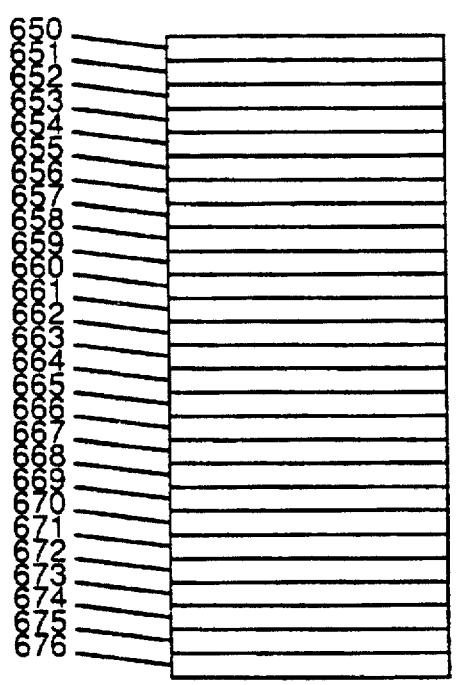
FIG. 6a is the physical structure of a Control Table 132 in memory in FIG. 1.
Figure 6B:
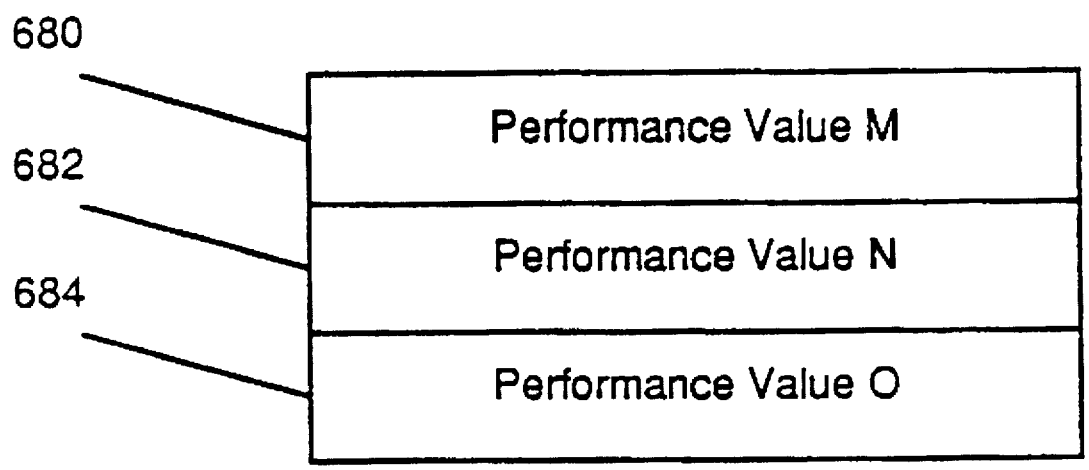
FIG. 6b is the structure of the running total memory storage locations.

FIG. 6, the Control Table 132, is used by two embodiments of the Alarm Processing routine 106. It is logically a 3 by 3 matrix which therefore has nine regions 610 which correspond to the cause and effect regions of the Cause and Effect Matrix. Each region contains three memory storage locations, MS 620, NS 630 and OS 640. Thus, there are nine memory storage locations MS 620, one for each cause and effect region 610; nine memory storage locations NS 630, one for each cause and effect region 610; and nine memory storage locations OS 640, one for each cause and effect region 610. FIG. 6a shows the physical structure of the resulting 27 memory storage locations 650 to 676. FIG. 6b shows the running total memory storage locations which are utilized by one embodiment of the Alarm Processing routine 106. There are three running total memory storage locations, one location 680 for storing the running total of Performance Value M, one location 682 for storing the running total of Performance Value N, and one location 684 for storing the running total of Performance Value 0.

Figure 7:
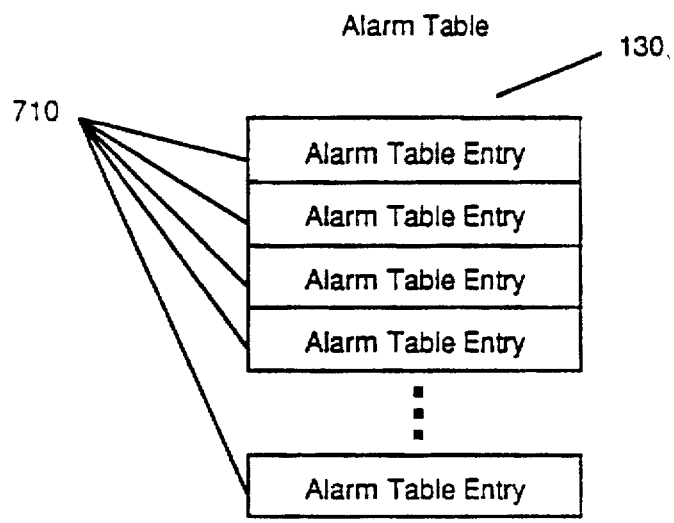
FIG. 7 is an Alarm Table 130 stored in a memory in FIG. 1.
Figure 7A:
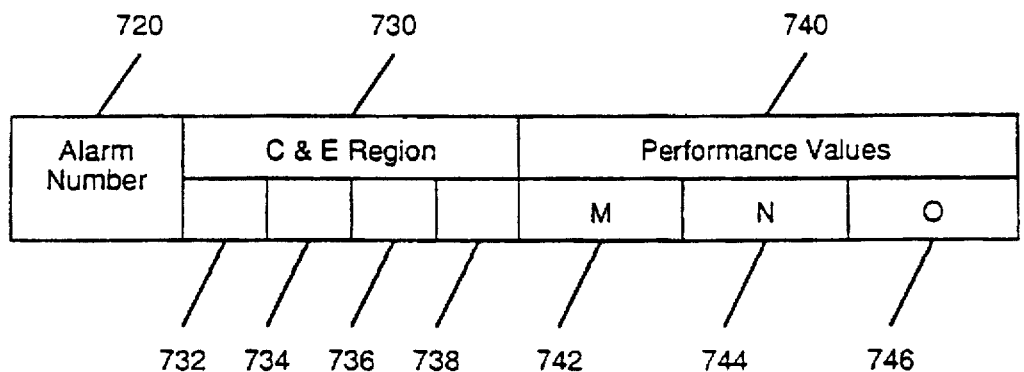
FIG. 7a is an Alarm Table entry format.
Figure 7B:
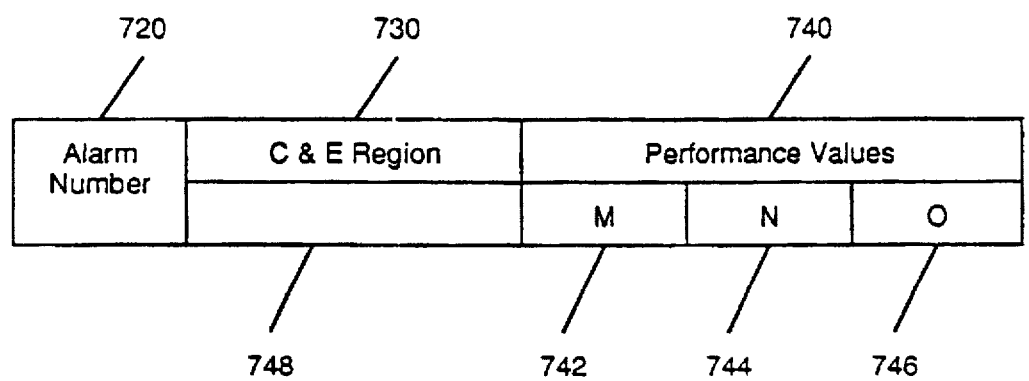
FIG. 7b is another embodiment of an Alarm Table Entry format.

FIG. 7, the Alarm Table 130, is a lookup table containing a plurality of entries 710. FIG. 7a shows the structure of each Alarm Table entry 710. The entry contains an alarm signal number 720, a Control Table region memory storage location 730 which contain from one to four region memory storage indicators 732 to 738, and a Performance Value memory storage location 740, containing the Performance Values M 742, N 744 and 0 746. FIG. 7b shows the structure of another embodiment of an Alarm Table entry 710. This embodiment differs from the first only in that instead of having from one to four Control Table region indicators 732 to 738, it has a single indicator 748 of the Control Table region associated with each alarm signal. FIG. 7c. is the Table of Selected Alarms and Performance Values 750 which shows the NACS alarm types 752 which have been selected for use in the invention and the corresponding alarm signal numbers 754, Control Table region indicator values 756 and Performance Values M 758, N 760 and O 762 which are used to populate the Alarm Table 130 in the preferred embodiment of the invention.

Figure 8:
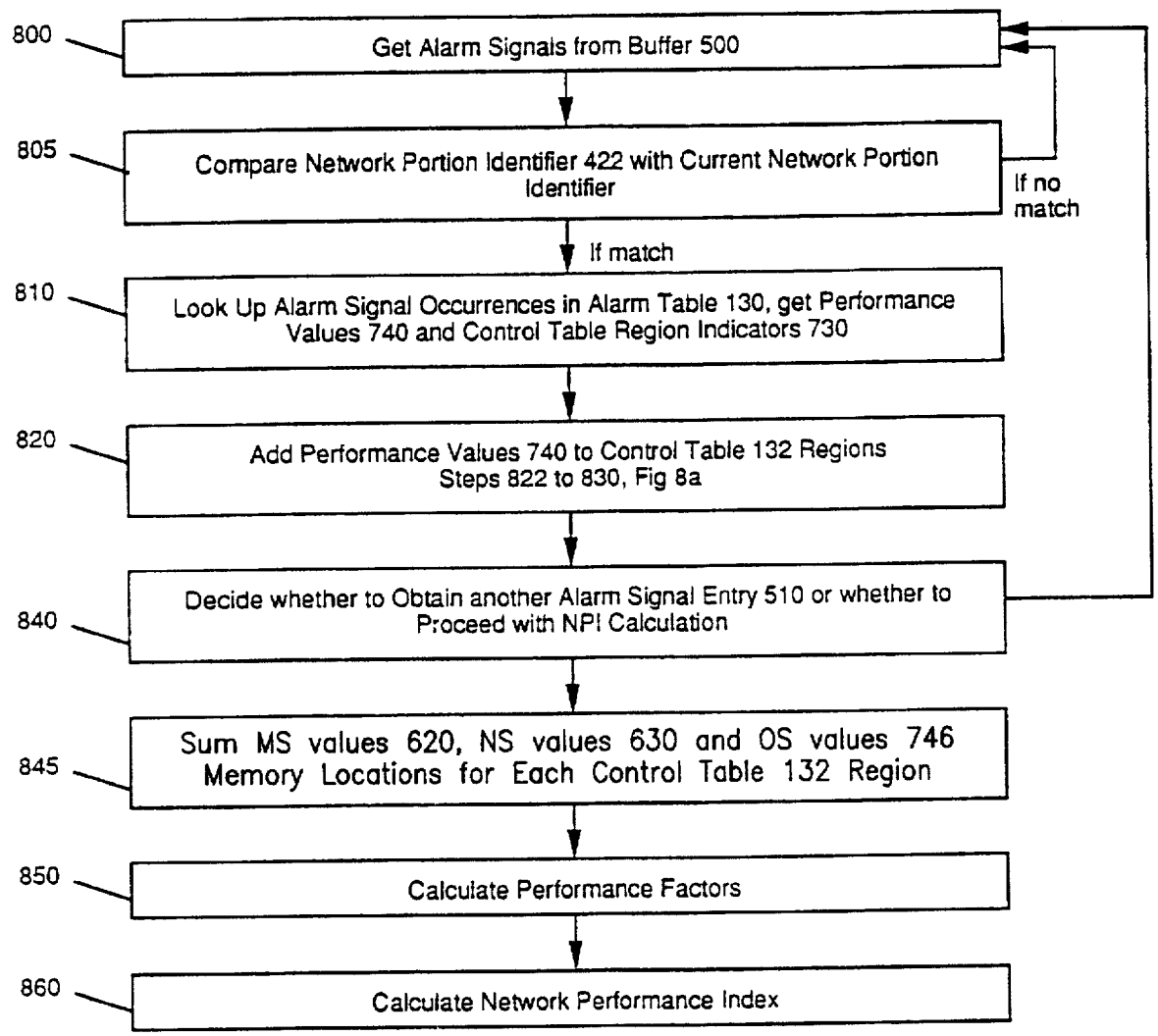
FIG. 8 is a flow diagram of an embodiment of an alarm processing routine included in FIGS. 1 and 2.
Figure 8A:
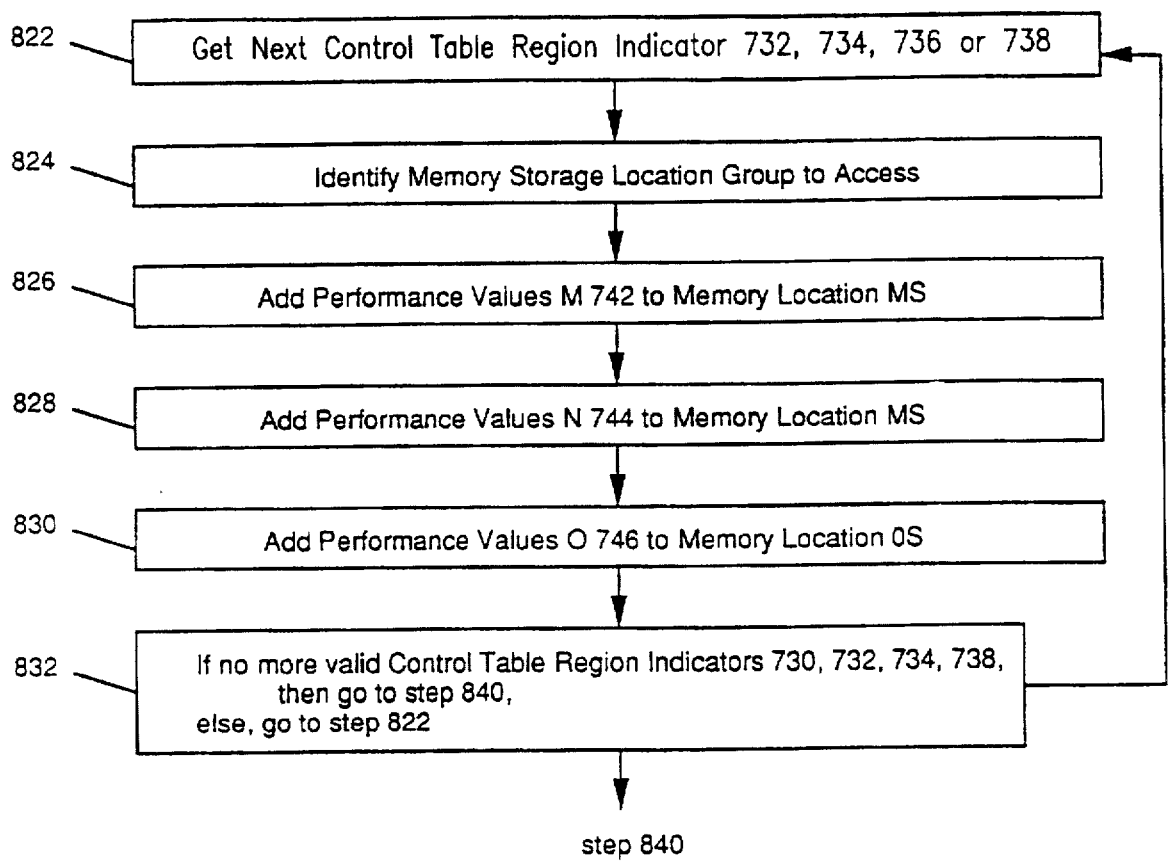
FIG. 8a is a flow diagram of the underlying steps of one step of the alarm processing routine.

FIG. 8 is best understood with reference to FIG. 5, FIG. 7 and FIG. 7a. In step 800, the routine gets an alarm entry 510 from the buffer 500. In step 805, the routine compares the network portion identifier 422 of the alarm entry 510 with a current network portion identifier. The current network portion identifier is preselected in order to allow the Network Performance Index to be calculated for a particular portion of the network. If the network portion identifier 422 of the alarm entry 510 does not match the current network portion identifier, the alarm entry 510 is not processed further and the routine goes to step 800 to get another alarm entry 510. If the network portion identifier 422 matches the current network portion identifier, the routine goes to step 810 to continue processing. In step 810, the routine looks up the alarm signal 416 in the Alarm Table 130 to obtain the associated Performance Values 740 and the region memory storage indicators associated with the Control Table region memory storage location 730. In step 820, the Performance Values obtained in step 810 are added to each appropriate Control Table 132 location. FIG. 8a shows the steps in this process. In step 822, the routine gets Control Table region indicators 732, 734, 736 or 738 from Control Table region memory storage location 730. There are always at least one, but no more than four, such indicators. In step 824, the routine uses the Control Table region indicator obtained in step 822 to identify the group of three memory storage locations, MS 620, NS 630 and OS 640 which are to be accessed. In step 826, the routine adds the Performance Value M 742 obtained in step 810 to the memory location MS 620. In step 828, the routine adds the Performance Value N 744 obtained in step 810 to the memory location MS 630. In step 830, the routine adds the Performance Value O 744 obtained in step 810 to the memory location OS 640. The routine then returns to step 822 and gets the next Control Table region indicator 730. If there are no more Control Table region indicators remaining, the routine goes to step 840. In step 840, the decision is made whether to obtain another alarm entry 510 from the buffer 500 or to proceed with the calculation of the Network Performance Index. There are two modes of operation in which this decision is made. The routine can always calculate the Network Alarm Index for each alarm entry 510. This mode allows continuous, immediate updating of the Network Performance Index. The routine can obtain all alarm entries 510 present in the buffer 500 before it proceeds with calculation of the Network Performance Index. This mode would be used for periodic updating of the Index. In step 845, the valves of memory locations MS 620 for each region of the Control Table are summed to derive the Errored Seconds value (ES). The memory locations NS values 630 are likewise summed to derive the Severely Errored Seconds value (SES). The memory locations OS values 746 are likewise summed to derive the Unavailable Seconds value (US). In step 850, the Performance Factors are calculated according to the following formulas:
1. Errored Seconds: Errored Seconds Performance Factor (ESPF)=(10−ES)/10
2. Severely Errored Seconds: Severely Errored Seconds Performance Factor (SESPF)=(4−SES)/4
3. Unavailable Seconds: Unavailable Seconds Performance Factor. (UASPF)=(25−UAS)/25

The values of 10, 4 and 25 for the ESPF, SESPF and UASPF respectively have been obtained from corporate customer performance objectives. These values are inter-office channel (IOC) for the average mode section of 800 miles.

In step 860, the actual Network Performance Index is calculated according to the formula:

$$NPI=((ESPF+SESPF+UASPF)/3)\times 100$$

The index is expressed as a percentage value since it represents a portion of the full capability of a transmission line.

Figure 14:
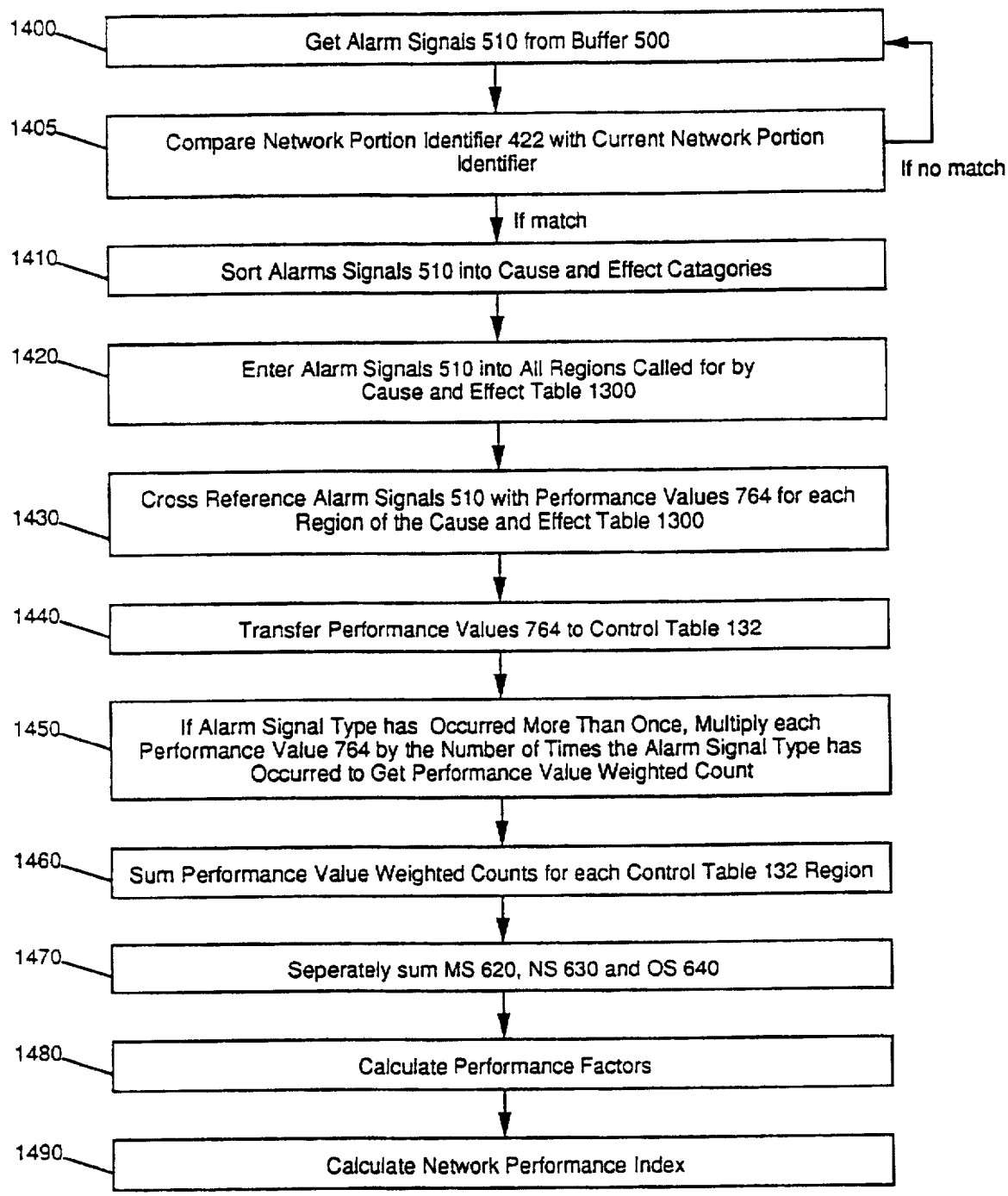
FIG. 14 is a flow diagram of another embodiment of the alarm processing routine included in FIGS. 1 and 2.

FIG. 14 is another embodiment of the alarm processing routine. In step 1400, the routine gets the alarm entries 510 from the buffer 500. In step 1405, the routine compares the network portion identifier 422 of the alarm entry 510 with a current network portion identifier. The current network portion identifier is preselected in order to allow the Network Performance Index to be calculated for a particular portion of the network. If the network portion identifier 422 of the alarm entry 510 does not match the current network portion identifier, the alarm entry 510 is not processed further and the routine goes to step 1400 to get another alarm entry 510. If the network portion identifier 422 matches the current network portion identifier, the routine goes to step 1410 to continue processing. In step 1410, the collected alarm signals 422 are sorted into cause and effect categories based on the cause and effect of the fault in the operational condition of the network element represented by each alarm signal. In step 1420, the alarm signal 422 is entered into all regions called for by the Cause and Effect Table 1300. Some alarms are present in as many as four regions of the Cause and Effect Table 1300. In step 1430, the alarm signal 422 for each region of the Cause and Effect Table 1300 are cross-referenced with the Performance Values 764 shown in the Alarm and Performance Value Table 130. In step 1440, the Performance Values 764 obtained in step 1430 are transferred to the Control Table 132. In step 1450, if an alarm signal type has occurred more than once, each Performance Value 764 is multiplied by the number of times the alarm type has occurred to obtain the Performance Value weighted count of the alarm type. In step 1460, the Performance Value weighted counts of each alarm type which has occurred within a region during the reporting period are summed. This results in a three values, MS 620, NS 630 and OS 640 for each region of the Control Table 132. In step 1470, all the MS values 620 in the Control Table 132 are summed to derive the Errored Seconds value (ES). All the NS values 630 in the Control Table 132 are summed to derive the Severely Errored Seconds value (SES). All the OS values 640 in the Control Table 132 are summed to derive the Unavailable Seconds value (US). In step 1480, the Performance Factors are calculated as in step 850 above. In step 1490, the Network Performance Index is calculated as in step 860 above.

Figure 15:
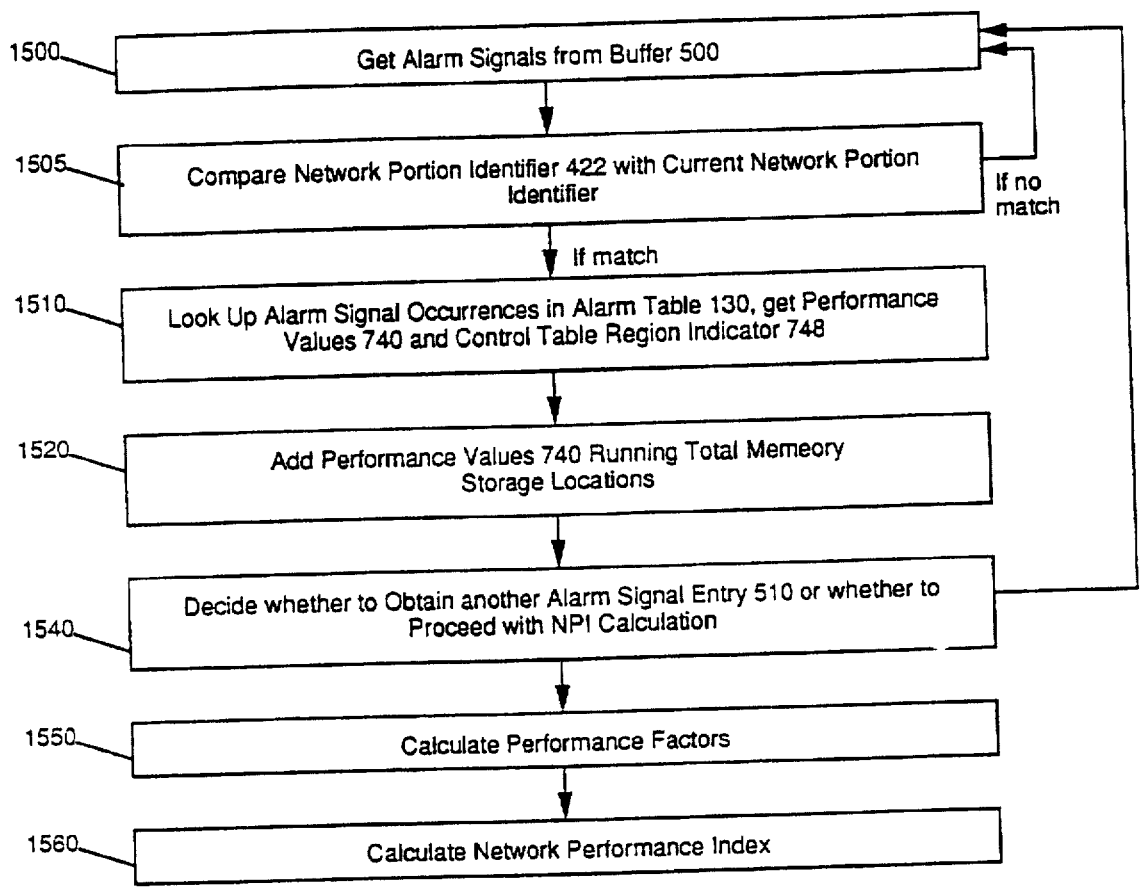
FIG. 15 is a flow diagram of another embodiment of the alarm processing routine included in FIGS. 1 and 2.

FIG. 15 is another embodiment of the alarm processing routine. FIG. 15 is best understood with reference to FIG. 5, FIG. 7 and FIG. 7b. Step 1500 is the same as step 800 of FIG. 8 and step 1505 is the same as step 805 of FIG. 8. In step 1510, the routine looks up the alarm signal 416 in the Alarm Table 130 to obtain the associated Performance Values 740 and the associated Control Table region indicator 730. In this embodiment, the Control Table region indicator is a single indicator 748 of the number of Control Table regions associated with the alarm signal entry 510. In step 1520, each Performance Value obtained in step 1510 is added to its respective running total memory storage location as many times as indicated by the Control Table region indicator 748. In this embodiment the 27 memory location Control Table structure 650–676 is not used. Rather, a Control Table running total structure comprising 3 memory locations 680, 682 and 684 is used instead. In step 1540, the decision is made whether to obtain another alarm entry 510 from the buffer 500 or to proceed with the calculation of the Network Performance Index as in step 840 of FIG. 8. In step 1550, the Performance Factors are calculated as in step 850 above. In step 1560, the Network Performance Index is calculated as in step 860 above.

Although three embodiments of the alarm processing routine have been described, it will be understood by those having skill in the art that other embodiments are possible. For example, the Alarm Table 130 disclosed above contains entries for both Performance Values 740 and Control Table region indicators 730. It will be understood by those having skill in the art that in an equivalent embodiment, the Alarm Table 130 could be implemented as two separate lookup tables, one containing the Performance Values 740 and one containing the Control Table region indicators 730. As another example, the above embodiment uses nine sets of memory locations MS 620, NS 630 and OS 640 to accumulate Performance Value sums separately for each region, then sums them in step 840. It will be understood by those having skill in the art that in an equivalent embodiment, one set of memory locations MS 720, NS 630 and OS 640 could be used to accumulate the Performance Value sum for all regions simultaneously, thus eliminating the need for step 840.

Figure 9:
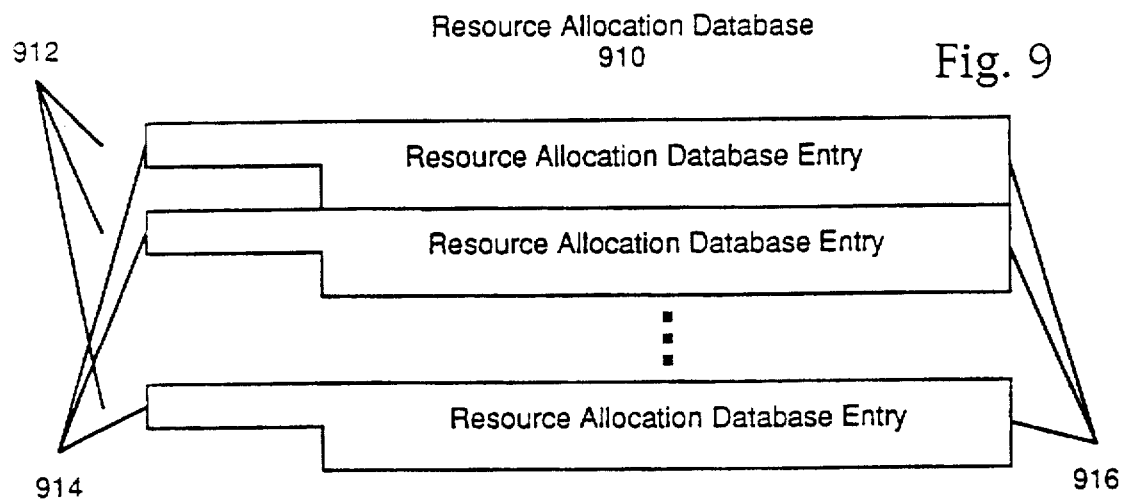
FIG. 9 is a resource allocation database format.
Figure 9A:
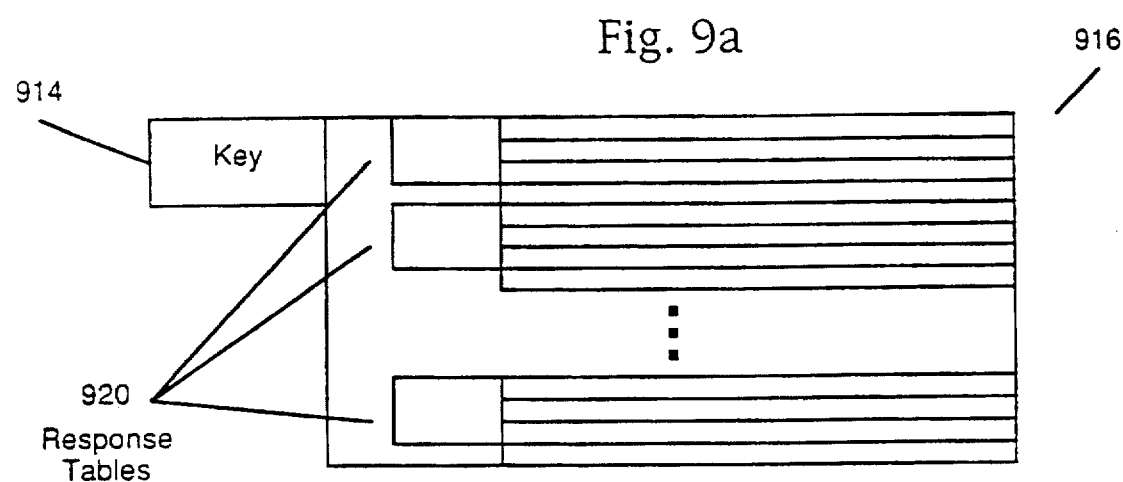
FIG. 9a is the format of a resource allocation database file entry 912.
Figure 9B:
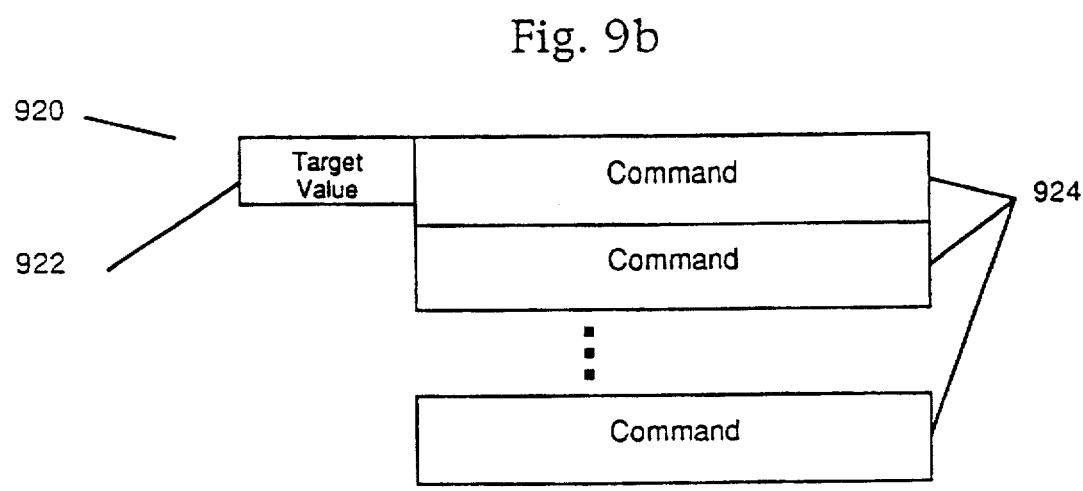
FIG. 9b is the format of the Network Performance Index value response entry 920.

In FIG. 9 the resource allocation database 910 is contained in the resource allocation database file 138 which is stored in the disk 122 or in the resource allocation database partition 136 which is stored in memory 102. The two embodiments are entirely equivalent. The choice of whether to use a file or a partition depends on the amount of data in the database and on the amount of storage available in the memory and the disk of the processor or processors actually being used. The resource allocation database 910 of the preferred embodiment contains at least one entry 912 for each portion of the telecommunication network being monitored. FIG. 9a is the format of a resource allocation database entry 912. Each entry 912 contains a network portion identifier key 914 and a resource allocation response table 916. The resource allocation response table 916 in turn contains at least one Network Performance Index value response entry 920. FIG. 9b is the format of the Network Performance Index value response entry 920. The entry contains a target value 922 and at least one resource allocation command 924.

Figure 10:
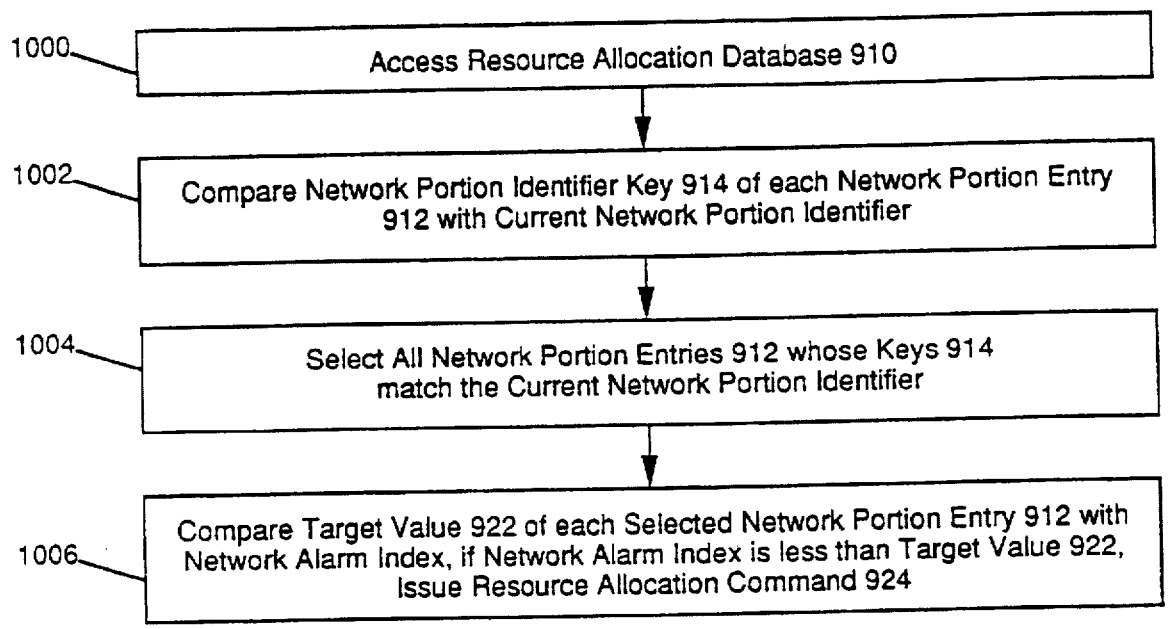
FIG. 10 is a flow diagram of the resource allocation routine included in FIGS. 1 and 2.

In FIG. 10 the resource allocation routine 134 includes step 1000 in which the resource allocation database file 910 is accessed. In step 1002, the network portion identifier key 914 of each network portion entry 912 is compared to the current network portion identifier which identifies the portion of the network for which the current Network Performance Index has been calculated. In step 1004, all network portion entries 912 whose network portion identifier keys 914 match the current network portion identifier are selected and their resource allocation response tables 916 are accessed. In step 1006, for each selected network portion entry 912, the value of the Network Performance Index is compared to the target value 922 of each Network Performance Index value response entry 920.

If the value of the Network Performance Index is less than the target value 922 of a Network Performance Index value response entry 920, the resource allocation commands 924 contained in that entry are automatically issued.

In FIG. 11 no commands are issued when the Network Performance Index is above 70%. For values less than 70%, commands are issued depending upon the value of the Network Performance Index. For example, for values less than 70%, the temporary reroute command is issued to the automated network routing system. This command caused network transmissions to be temporarily routed around the portion of the network with degraded performance, as indicated by the Network Performance Index.

In FIG. 13 the table categorizes alarm signals into different regions of the matrix based on the cause and effect of each alarm. This matrix was derived empirically by the following procedure:

Three categories were established based on the causes of the generated alarm. These were placed in their respective columns in the Cause and Effect Matrix 900:

| Category | Cause |
|---|---|
| AC: | alarms associated with the switching of transmission facilities onto its protected route or circuitry. |
| BC: | alarms associated with a degradation in the transmission network. |
| CC: | alarms associated with a failure of the transmission equipment to operate. |

Three categories were also established based on the effect of the generated alarm. These were placed in their respective rows in the Cause and Effect Matrix 900:

| Category | Effect |
|---|---|
| AE: | alarms that indicate the telecommunications network is more susceptible to lower transmission performance. |
| BE: | alarms that result from degraded performance on the telecommunications network. |
| CE: | alarms that provide information regarding outages. |

The three-by-three Cause and Effect Matrix produces nine regions. The term "region" on the matrix has no relation to the geographic regions of the telecommunications network. Regions 1 through 9 are correlated to determine the type of degradation and its effect on the transmission system.

Turning to FIG. 7b, the Table of Selected Alarms and Performance Values or Alarm Table 750 summarizes the alarm types selected for inclusion, their cause and effect regions and their associated Performance Values. There are 2772 alarm types generated by the NACS system. Each of these alarm types can be assigned to one or more of the nine Cause and Effect Matrix 1300 regions. Most of these alarms have little or no impact on network performance. A subset of all the alarm types was selected for inclusion in this process based on a series of rules formulated to include only those alarm types with significant impact. The alarms which were selected for inclusion are shown in the Alarm Table 750. The rules for selection are rather broad because there are significant differences between the types of equipment deployed in the field. The rules are also broad because the various manufacturers of the equipment may have specified different conditions under which the equipment generates a given alarm. In order for an alarm to be included in a region of the Cause and Effect Matrix 1300, it therefore must generally comply with the specified rules:

Region 1 Rules:
Increased Network Susceptibility due to Transmission Switching Activity The alarm must be generated when the switching event takes place.

The alarm must lead to switching activity on the network.

The alarm must be associated with the designed protection of the lightwave system or the ability to use the spare.

The alarm must be associated with the optical laser or operation of its subassembly.

Region 2 Rules:
Increased Network Susceptibility due to Transmission Signal Degradation The alarm must be associated with degradation of transmission system signals (i.e. framing, bit error rate, etc.) leading to capability reduction of the transmission network element.

Region 3 Rules:
Increased Network Susceptibility due to Transmission Failure

The alarm must be caused by failure of the transmission network equipment or any of its subassemblies, in such a way that it interferes with normal operation and capability of the equipment.

Region 4 Rules:
Network Performance Degradation due to Transmission Switching Activity The alarm must be caused by transmission switching events and cause performance degradation of the transmission network. Alarms that provide information regarding the circumstances that lead to switching activity should also be included in this region. These alarms could indicated immediate performance degradation or indicate performance degradation at the occurrence of the most likely next event which causes the transmission network element to switch.

Region 5 Rules:
Network Performance Degradation due to Transmission Signal Degradation The alarm must provide information regarding signal degradation that results in network system capability reduction.

Region 6 Rules:
Network Performance Degradation due to Transmission Failure

The alarm must provide failure information regarding a network element or its subassembly that directly impacts transmission network capability.

Region 7 Rules:
Outages due to Transmission Switching Activity

The alarm must provide switching information about a failure condition that leads to immediate switching activity.

Region 8 Rules:
Outages due to Transmission Signal Degradation

The alarm must provide information associated with the degradation of transmission signals which result in or lead to network element outage.

Region 9 Rules:
Outages due to Transmission Failure

The alarm must directly provide information regarding failure of a transmission network element or any of its subassemblies.

Based on these rules, a subset of all alarm types was selected for inclusion in the Alarm Table 750. For each alarm entered in the Alarm Table 750, three Performance Values 764 were chosen in order that the resultant Network Performance Index correlate as closely as possible to the actual network alarm and performance activity for OC-48 and Alcatel 21130. The three Performance Values 764 are arbitrarily designated M 758, N 760 and O 762. In particular, some of the selected alarm types have a major impact on the lightwave transmission network, based on the present high-capacity transmission system architecture. The Performance Values have been chosen to model the impact of each alarm as follows:

A. 153,1521,1522,1181 and 1195 alarms are the same type of alarm for different systems. These alarms provide information as to the switching activity of the transmission network element and are assigned the Performance Values M=0.5, N=0.2 and O=0.

B. 1509 and 1017 alarms are the same type of alarm for different systems. These alarms provide information as to the bit error rate performance degradation of the transmission system. They are assigned the Performance Values M=0.5, N=0 and O=0 based on an average event duration of 17 seconds.

C. The selected alarms are also grouped according to function and each alarm within a functional group must have the same Performance Value assignment:

a. 161, 1182, 1196, 1505 and 1506 represent an incomplete switching attempt.

b. 1324 represents a switching device failure.

c. 1085, 1083, 1507 and 1508 represent an optical receiver failure.

d. 636 and 1084 represent loss of optical signal.

e. 1017, 1509 and 1510 represent excessive bit error rate.

f. 153, 1181, 1195, 1521 and 1522 represent that traffic has been switched to a spare.

g. 182, 1179, 1193, 1515 and 1516 represent that traffic cannot be switched to a spare.

h. 1503 and 1504 represent equipment failures.

As a result of these selection rules, an alarm may be assigned to multiple categories.

The selected Performance Values themselves are shown in columns M 758, N 760 and O 762 of the Alarm Table 750. The Performance Values 764 represent the impact on the telecommunications network as determined by the magnitude of observed changes each alarm has on ESF performance data from the channel 28 ESF/MU monitoring system.

Every DS-3 transmission service comprises 28 T-1 channels. The data on at least the 28th T-1 channel is formatted according to the Extended Superframe Format standard (ESF). ESF provides several functions, including cyclic redundancy check error detection (CRC-6). The ESF standard allows easy storage and retrieval of error information, facilitating monitoring of network performance.

The numerical value of each Performance Value were determined experimentally and are specific to the particular telecommunications network being monitored. In order to determine the appropriate numerical value for each Performance Value, the effect of each alarm on three categories of performance degradation was observed. The three categories are:

Errored Seconds (ES):

Any one second interval that has one or more bits in error. The CRC-6 code violation identifies the presence of an error without regard to the number of bits in error. It is highly unlikely that a NACS alarm which affects service will produce fewer than 320 CRC-6 errors in one second.

Severely Errored Seconds (SES):

Any one second interval that has more than 320 CRC-6 code violations or where the bit error rate exceeds 1×10e–3 at the DS1 level or 1×10e–6 at the DS3 level.

Unavailable Seconds (UAS):

Whenever 10 consecutive SES have occurred, unavailable seconds are counted until 10 consecutive non-SES have occurred.

In this manner, each alarm is assigned Performance Values 764 for Errored Seconds, Severely Errored Seconds, and Unavailable Seconds. Therefore, in the Alarm Table 750, M 758 designates the Performance Value corresponding to Errored Seconds, N 760 designates the Performance Value corresponding to Severely Errored Seconds and O 762 designates the Performance Value corresponding to Unavailable Seconds.

Although specific embodiments of the invention have been disclosed, it will be understood by those having skill in the art that changes can be made to the specific embodiments without departing from the spirit and scope of the invention.

What is claimed is:

1. A method for automatically allocating available resources of a telecommunications network to efficiently resolve network problems and improve the performance of said network, said method comprising the steps of:

a) collecting in a buffer a plurality of alarm signals, each of said alarm signals representing a fault in the operation of an element of said telecommunications network;

b) calculating at least one network performance index for at least one portion of said telecommunications network, said calculating step including assigning to said each alarm signal at least one performance value, said performance value representing an impact on a different aspect of the network performance said fault caused in the operation of the network element associated with said each alarm signal, assigning to said each alarm signal an indicator of a number of cause and effect categories associated with said each alarm signal, each of said cause and effect categories representing the cause and effect said fault has on the operation of the network element associated with said each alarm signal, summing the at least one performance value assigned for said each alarm signal a given number of times as indicated by said indicator assigned to said each alarm signal, and combining the summed performance values of said plurality of alarm signals to produce said one network performance index;

c) comparing the value of said one network performance index with at least one predetermined target value for said one network performance index; and d) allocating said available resources to enhance the performance of said telecommunications network, if the value of said one network performance index is less than said at least one target value.

2. The method of claim 1 wherein said performance value assigned to said each alarm signal comprises:

a first performance value representing errored seconds of the network element;

a second performance value representing severely errored seconds of the network element; and a third performance value representing unavailable seconds of the network element.

3. The method of claim 2 wherein the step of combining the summed performance values of said plurality of alarm signals to produce said network alarm index further comprises the steps of:

weighting summed first performance values of said plurality of alarm signals according to the formula $$ESPF=(10-ES)/10,$$

where

ESPF is Errored Seconds Performance Factor,

ES is said summed first performance values;

weighting summed second performance values of said plurality of alarm signals according to the formula $$SESPF=(4-SES)/4$$

where

SESPF is Severely Errored Seconds Performance Factor,

SES is said summed second performance values; and weighting the summed third performance values according to the formula $$UASPF=(25-UAS)/25$$

where

Unavailable Seconds Performance Factor,

SES is said summed third performance values.

4. The method of claim 3, further comprising the step of: combining the weighted sums according to the formula $$NPI=((ESPF+SESPF+UASPF)/3)\times 100$$

where

NPI is said network performance index,

ESPF is the Errored Seconds Performance Factor,

SESPF is the Severely Errored Seconds Performance Factor, and

UASPF is the Unavailable Seconds Performance Factor.

5. The method of claim 4, further comprising the steps of:

associating the indicator of each of said cause and effect categories of said each alarm signal with a designator for said each category; and summing each respective ones of said plurality of performance values for said each alarm signal for said each cause and effect category, wherein for said each cause and effect category designated, calculating a first sum of the performance value assigned to aid each alarm signal that has been sorted into said each cause and effect category, and calculating a second sum based on said first sum of the performance values for all said cause and effect categories.

6. The method of claim 4, further comprising the steps of:

including a designator for the indicator of each of said cause and effect categories associated with said each alarm signal; and summing each respective ones of the plurality of performance values for said each alarm signal for said each cause and effect category with which said alarm signal is associated, wherein for said indicator for said each cause and effect category, repeating the steps of retrieving a cause and effect category indicator, selecting a group of running totals of performance values, said group indicated by said cause and effect category indicator, adding said each associated performance value to the running total of that performance value, and summing the respective running totals for each performance value for all said cause and effect categories.

7. An apparatus for enhancing the performance of a telecommunications network in receipt of a plurality of alarm signals each representing a fault to the operation of a network element of said telecommunications network, said telecommunications network having resources which may be selectively allocated to enhance the performance of said telecommunications network, comprising:

means for collecting at a central location said alarm signals;

means, coupled to said collecting means, for calculating at least one network performance index for at least one portion of said telecommunications network, including means for assigning to said each alarm signal a plurality of performance values and an indicator of the number of cause and effect categories associated with said each alarm signal, each of said performance values representing an impact to the network performance of the network element association with said each alarm signal caused by said fault, means for summing each respective ones of the plurality of performance values for said each alarm signal for each of said cause and effect categories indicated by said cause and effect category indicators and means for combining the summed performance values of said plurality of alarm signals to produce said network performance index;

means, coupled to said calculating means, for comparing the value of said calculated network performance index with a predetermined target value for said network performance index; and means, coupled to said comparing means, for selectively allocating said resources to enhance the performance of said telecommunications network if the value of said network performance index is less than said predetermined target value.

8. An apparatus for enhancing the performance of a telecommunications network in receipt of a plurality of alarm signals each representing a fault to the operation of a network element of said telecommunications network, said telecommunications network having resources which may be selectively allocated to enhance the performance of said telecommunications network, comprising:

means for collecting at g central location said alarm signals;

means, coupled to said collecting means, for calculating at least one network performance index for at least one portion of said telecommunications network, including means for repeatedly retrieving a collected alarm signal from said collecting means and for indicating that sufficient alarm signals have been retrieved, means for assigning to said each alarm signal a plurality of performance values and at least one control table region indicator, means for adding said each performance value to a respective one of a plurality of running totals of performance values in every control table region designated by control table region indicators, means for summing the respective running totals for each performance value for all control table regions, and means for combining said running totals to produce said network performance index, means, coupled to said calculating means, for comparing the value of said calculated network performance index with a predetermined target value for said network performance index; and means, coupled to said comparing means, for selectively allocating said resources to enhance the performance of said telecommunications network if the value of said network performance index is less than said predetermined target value.

9. The apparatus according to claim 8 wherein said means for adding performance values to running totals comprises:

means for repeatedly retrieving control table region indicators and for providing an indication when there are no more control table region indicators to be retrieved;

means for selecting a running total of performance values designated by said control table region indicator; and means for adding each said associated performance value to the running total of that performance value.

10. The apparatus according to claim 7 wherein said means for assigning performance values comprises:

means for assigning a first performance value representing errored seconds of the network element;

means for assigning a second performance value representing severely errored seconds of the network element; and means for assigning a third performance value representing unavailable seconds of the network element.

11. The apparatus of claim 7 wherein said means for combining the summed performance values comprises:

means for calculating a first weighted sum of said first performance values according to the formula $$ESPF=(10-ES)/10,$$

where

ESPF is Errored Seconds Performance Factor,

ES is a first sum of said first performance values;

means for calculating a second weighted sum of said second performance values according to the formula $$SESPF=(4-SBS)/4$$

wherein

SESPF is Severely Errored Seconds Performance Factor,

SES is a second sum of said second performance value; and means for calculating a third weighted sum of said third performance value according to the formula $$UASPF=(25-UAS)/25$$

where

UASPF is Unavailable Seconds Performance Factor,

UAS is a third sum of said third performance value.

12. The apparatus of claim 7 wherein said means for combining summed performance values comprises:

means for calculating said network performance index, according to the formula $$NPI=((ESPF+SESPF+UASPF)/3)\times 100$$

where:

NPI is said network performance index,
ESPF is the Errored Seconds Performance Factor,
SESPF is the Severely Errored Seconds Performance Factor, and UASPF is the Unavailable Seconds Performance Factor.

* * * * *